United States Patent Office 3,267,323
Patented August 16, 1966

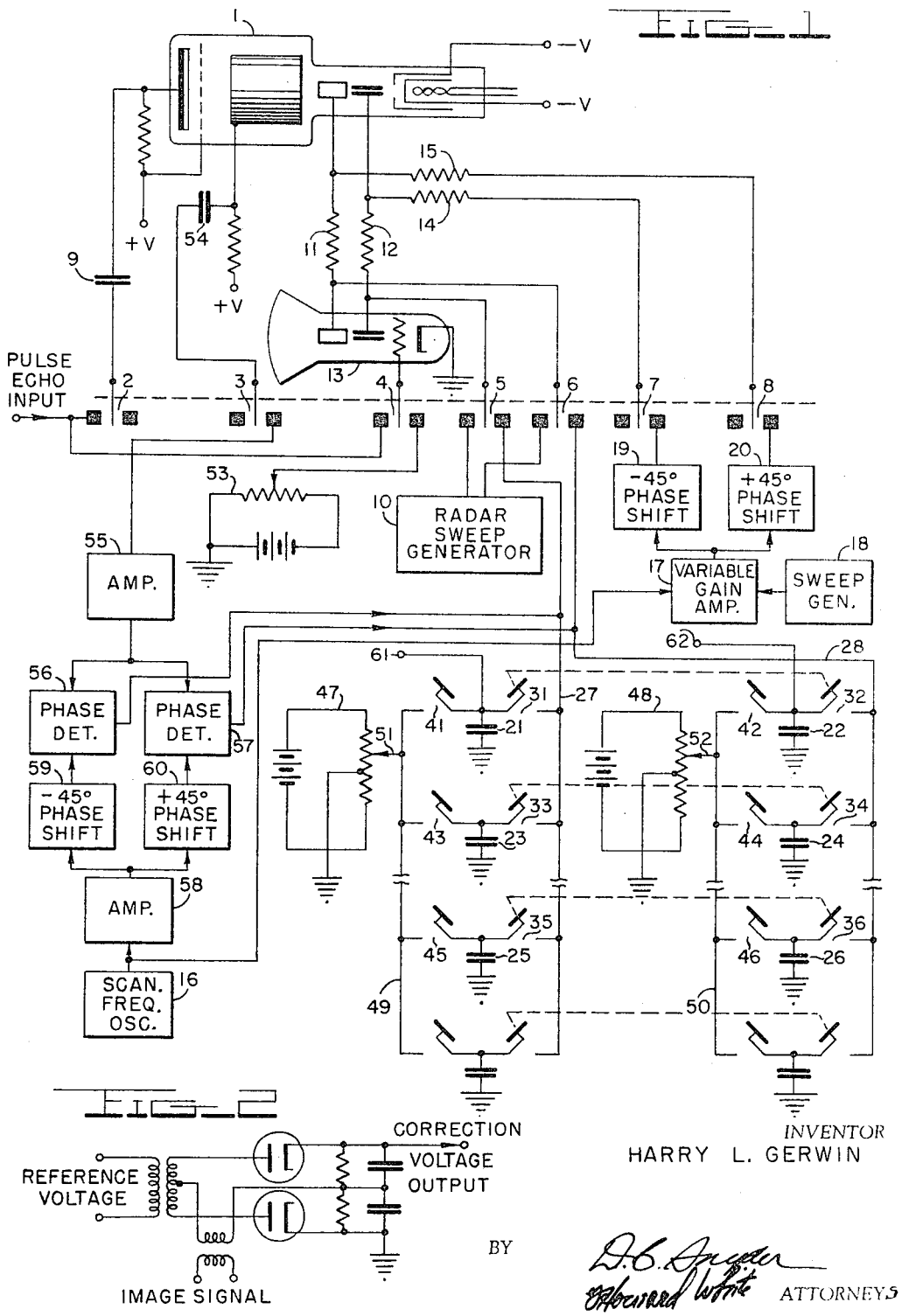

3,267,323
SINGLE SERVO MULTIPLE TARGET AUTOMATIC TRACKING CIRCUIT
Harry L. Gerwin, Grayton, Md., assignor to the United States of America as represented by the Secretary of the Navy
Filed Oct. 4, 1951, Ser. No. 249,792
14 Claims. (Cl. 315—18)

This invention relates to pulse-echo position indicating systems and more particularly to systems adapted to continuously and automatically track the changing positions of selected targets detected by pulse-echo searching systems.

Automatic tracking principles have heretofore been applied to pulse-echo radar systems wherein the received video information from the search radar is utilized to control mechanical servo units. These systems provide for the automatic tracking of single targets and require one servo unit for each coordinate in which the target is being tracked. In order to completely locate a target, the minimum number of servo units is three, one for each coordinate. A set of three servo units are thus required for each target being tracked. Such systems further employ equipment of considerable bulk while affording the limited performance of single-channel tracking.

When the occasion demands the simultaneous tracking of numerous targets the single-channel system obviously is not feasible. Even disregarding weight and space factors, intelligent coordination and comprehensive of the voluminous data obtainable from a search radar through the use of a plurality of single-channel circuits is difficult if not impossible.

It is, therefore, an object of the present invention to provide an automatic tracking system capable of continuously tracking multiple targets.

Another object of the present invention is to apply time-sharing principles to automatic tracking systems which enables such systems to continuously track multiple targets.

A further object of the present invention is to provide an automatic tracking system for multiple targets in which a single set of servos is employed.

Still another object of the present invention is to provide an improved servo system in automatic tracking systems. A feature of my invention is the provision of a servo system devoid of and thereby unrestricted by mechanical moving parts.

A still further object of the present invention is the provision of an automatic tracking system which is economical of weight and space.

Other and further objects of the present invention will become apparent from the following description when taken in conjunction with the accompanying drawings, in which:

FIGURE 1 is a schematic block diagram of an automatic tracking system embodying my invention.

FIGURE 2 is a schematic diagram of the phase detector illustrated in block in FIGURE 1.

As exemplified in FIGURE 1, the time-sharing principles of the present invention are applied to an automatic tracking system utilized in conjunction with a search radar system. Solely for simplicity of illustration the search radar system is considered to be one in which a particular target is tracked in two coordinates only. The search radar presentation may be of the plan position indication (PPI) type wherein the radar video contains information involving range and azimuth data of numerous targets, all of which may be in continuous motion. In the disclosed embodiment of my invention the search radar video is received by a plan position radar and is thence applied to and stored in a conventional memory tube screen as a plan position indication. The screen is scanned by the reading beam of the tube, the reading beam being deflected to scan only a small area of the screen commensurate with the size of the stored target images. The reading beam scan is adapted to be shifted or biased to sequentially read off at least a portion of the target images being tracked. When the reading beam scan is caused to partially overlap a particular stored target image, a read-off signal is generated which is utilized to correct the reading beam scan bias to center the beam scan on that image. After correction the beam scan bias accurately corresponds to the coordinates of the tracked target. Storage units are provided to store the coordinate data for each target, the data being continuously corrected as the reading beam scan is shifted.

Referring now to FIGURE 1, storage tube 1 is shown to be of the barrier grid STE type more fully illustrated and described in Electron Tubes, volume II, published March 1949 by the Radio Corporation of America, pages 384 to 407. Any suitable means for storing the radar video, however, may be provided. Only those elements of tube 1 which are essential to the illustration of the present invention are shown, i.e., electron gun, horizontal and vertical deflection plates, secondary beam collecting anode, barrier grid, and insulating target or screen and plate. In operation, the writing beam generated by the electron gun is caused to scan the insulating target according to a predetermined repetitive pattern. When a signal is impressed on the plate, the beam deposits a charge pattern on the insulating target which is a linear reproduction of the time variation of the impressed signal. The charge pattern or signal is read-off the target by the reading beam, also generated by the electron gun. The read-off signal consists of modulations in the secondary beam of electrons collected by the collecting anode.

As described more fully hereinafter, the electron beam of tube 1 functions as the writing beam during the writing period to paint on the target thereof images of remote objects being tracked according to their plan position. The electron beam also functions as the reading beam in the reading period, the writing and reading periods occurring alternately and of substantially equal time duration. The time duration of the reading period is controlled by the pulse repetition rate of the radar transmitter in the search radar system.

The single pole double throw synchronous switches 2, 3, 4, 5, 6, 7 and 8 of any convenient known construction are ganged and provide for the duplex operation of tube 1. Exemplary types which might be employed for this purpose are the vibrating harmonic reed, Brown inverter or a suitable electronic switch. The synchronous switches are in the left-hand position in FIGURE 1 for the writing period and in the right-hand position for the reading period. By providing for duplex operation of storage tube 1, the system is simplified, however, synchronous switches 2 to 8 may be eliminated by adapting the circuitry to the double-ended type of storage tube illustrated, for example, in the Beers Patent 2,273,172, issued February 17, 1942.

During the writing period search radar video is applied to the plates of storage tube 1 through switch 2 and input condenser 9. Coincidentally therewith, beam deflection voltage from radar sweep generator 10 is applied to the horizontal and vertical storage tube deflection plates through switches 5 and 6 and resistances 11 and 12. If the search radar is of the PPI type, the sweep generator 10 may generate conventional PPI sweep voltages resulting in the typical PPI radar picture being painted on the storage tube screen.

Visual observation of the radar picture is obtained by monitor cathode ray tube 13 which functions in the conventional manner, radar video being applied to the intensity grid thereof through switch 4 and radar sweep voltages from generator 10 being applied to the deflection plates thereof through switches 5 and 6.

In the writing period switches 3, 7 and 8 are open.

The reading beam scan deflection voltage is applied to the deflecting plates of storage tube 1 through the right hand contacts of switches 7 and 8 and resistances 14 and 15. In the disclosed embodiment of my invention the scan deflection voltage, when applied to the deflection plates of a cathode ray tube, will cause the cathode ray beam thereof to trace a spiral path on the tube screen. Spiral scanning is well known and may be accomplished in electrostatic deflection cathode ray tubes by applying a saw-tooth modulated sine wave voltage to the vertical deflection plates in phase quadrature with a similar voltage applied to the horizontal deflection plates. In FIGURE 1 a sine wave generated in scan frequency oscillator 16, fed to variable gain amplifier 17, is modulated by a saw-tooth voltage from sweep generator 18. The saw-tooth modulated sine waves output from amplifier 17 is fed to phase shifters 19 and 20 and applied in phase quadrature to the vertical and horizontal deflection plates of tube 1 through switches 7 and 8 and resistances 14 and 15.

Sweep generator 18 controls the repetition frequency to the spiral scan, the period of which is preferably set substantially equal to the time duration of the writing period. At this setting the write-read cycle will comprise the painting of a line on the storage tube screen for the writing period followed by one complete spiral scansion for the reading period. The number of turns in the spiral scan is determined by the frequency of oscillator 16, with respect to that of the sweep generator 18 and variable gain amplifier 17 controls the spiral scan diameter. The minimum spiral scan diameter is mainly determined by the expected paint size of the object image on the storage tube screen and the distance a particular object image may be expected to travel on the storage tube screen in a predetermined interval of time, as will become apparent hereinafter. In order to obtain accurate tracking of numerous targets, the maximum diameter of the spiral scan should be no larger than necessary to fulfill the above requirements.

It is to be understood that any method of scanning a small area of the storage tube screen may be utilized. A spiral scan is herein exemplified only because of its simplicity and adaptability to the servo system to be described.

The spiral scan is normally centered with respect to the screen of tube 1, but is adapted to be shifted or biased in any desired direction by means of biasing voltages from bias voltage storage units 21, 23 and 25, and 22, 24 and 26, shown as condensers. The storage units are adapted to be sequentially connected to the deflection plates of tube 1 in pairs by means of sequentially closing and opening switches 31, 33 and 35, and 32, 34 and 36 in pairs. Any suitable means of rapidly sequencing switches 31 to 36 may be provided.

The order of sequence switching is as follows: 31–32, 33–34 and 35–36; which effects the sequential connection of storage unit pairs 21–22, 23–24 and 25–26, respectively to common lines 27 and 28. Line 27 is connected through switch 5 and resistance 12 to one set of storage tube deflection plates, and line 28 is connected through switch 6 and resistance 11 to the other set of deflection plates.

Manually operated switch pairs 41–42, 43–44 and 45–46 are provided for selectively connecting the storage unit pairs to potentiometer units 47 and 48 through common lines 49 and 50 and potentiometer arms 51 and 52, respectively. Each of potentiometer units 47 and 48 are shown to comprise a battery, a potentiometer resistance with a grounded center tap and a potentiometer arm. Any means of separately adjusting, to either positive or negative values, the stored voltage of the storage units in each pair, however, will suffice.

In operation, when any one of the sequence switch pairs is closed, the bias voltage stored in the corresponding storage unit is superimposed on the spiral scan deflection voltage by means of resistances 11, 12, 14 and 15. This superimposition effects a shift of the reading beam scan in direction and magnitude from the center of the storage tube screen in accordance with the polarity and magnitude of the stored voltages of the connected storage unit pair. By the proper initial setting of the storage unit voltages the reading beam scan may thus be caused to sequentially overlap at least a portion of the initial positions of separate object images on the storage tube screen. Although only four storage unit pairs are shown in FIGURE 1, it should be readily apparent that additional units may be added as desired. The tracking of as many as 50 targets by proper design of the system is quite feasible which would thus require a like number of storage unit pairs.

In order to visually observe the shift of the reading beam scan resulting from variations in the storage unit voltages, the combined spiral scan deflection voltages and the bias voltages are also applied to the deflection plates of cathode ray tube 13. The persistence of fluorescence of the screen of tube 13 should be such as to enable direct observation of the reading beam scan superimposed on the search radar picture. For adjusting the intensity of the reading beam trace, control bias 53 is connected to the intensity grid of tube 13 in the reading period by switch 4.

When the reading beam scan overlaps any portion of a charged area on the screen of tube 1, corresponding to a stored object image, an output or read-off image signal appears as a modulation of the secondary beam at the collecting anode of tube 1. This output signal is fed through condenser 54, switch 3 and amplifier 55 to a pair of phase sensitive detectors 56 and 57. The sine wave output of scan frequency oscillator 16 is used as a reference voltage for the phase detection operation, the sine wave being fed through amplifier 58 and phase shifter 59 to phase detector 56, and through amplifier 58 and phase shifter 60 to phase detector 57. Phase shifters 59 and 60 are effective to cause a 90° phase difference in the reference voltages applied to phase detectors 56 and 57. Output voltage from phase detector 56 is fed to common line 27 and from phase detector 57 to common line 28.

Phase sensitive detectors 56 and 57 may be of conventional types, as shown, for example, in FIGURE 2, which operate in a well-known manner. By applying reference voltages from oscillator 16 to the said detectors in phase quadrature together with image signals from tube 1, the desired "servo" control voltage is obtained.

The "servo" control voltage is generated whenever the reading beam scan overlaps at least a portion of an object image stored on the screen of tube 1, but not precisely centered thereon. For example, assuming the beam scan to be vertically off-center with respect to a particular object image, an image signal will be applied to phase detector 56 out-of-phase with respect to the reference voltage from phase shifter 59. In the conventional manner of phase detector operation, an output voltage will be generated which is of a polarity dependent upon whether the image signal pulse occurs during positive or negative half-cycles of the reference voltage. By proper application of the phase detector output voltage to the common storage unit lines 27, the voltage of the connected storage unit will be appropriately varied, causing a shift of the center of the reading beam scan vertically toward the center of the object image. In a like manner output voltage from phase detector 57, resulting from phase quadrature comparison of the image signal with the reference voltage, will vary the voltage of the storage unit connected to line 28 to cause horizontal shifting of the beam scan toward the center of the object image.

Output terminals 61 and 62 are shown for storage units 21 and 22. Each of the storage units will be provided with similar output terminals whereby the corrected storage unit voltages, representing object image coordinates, may be fed to utilization devices of the desired character.

The sequential switching of switches 31 to 36, although done rapidly, permits several successive reading beam scans for each object image resulting in a more accurate servo and tracking action.

It is to be noted that the several reading beam scansions are effective to erase any charge appearing on the particular target area being scanned, thus preventing the storage of stale information. Other echoes received from the search radar which may represent land areas or other stationary objects not desirable for storage, tend to be erased by the writing beam if the apparatus is employed on a mobile vehicle. The erasing action of the writing beam may be increased by utilizing the beam re-trace.

Summarizing the operation of the system, synchronous switches 2 to 8 in the left hand position of FIGURE 1 first connect the search radar video and the modified radar sweep generator to storage tube 1, which stores the radar picture, and to conventional cathode ray tube 13 on the screen of which the radar picture visually appears. Assuming only a single target, the servo or tracking action is initiated by closing a pair of the switches 41-42, 43-44 or 45-46, for example, switches 41-42, and adjusting potentiometer arms 51 and 52 until the reading beam scan is seen on tube 13 to overlap the object image. This sets the voltage of storage units 21 and 22 to a value representing the initial X and Y coordinates of the target being tracked. Manual switches 41 and 42 are then opened. Thus, in the reading period, synchronous switches 2-8 being positioned to the right in FIGURE 1, whenever sequence switches 31 and 32 close, the servo action described above is effective to reset the voltage stored in storage units 21 and 22 corresponding to a change in the X and Y coordinates of the target.

As alluded to hereinbefore, the system has been described in connection with a search radar system of the plan position indication (PPI) type in which the target coordinates are azimuth and range. The target is reduced in the system to a charged area on a substantially planar surface, or in other words, is defined in plan position on the storage tube screen from which the polar coordinates thereof are converted to cartesian coordinates. The basic system and principle is extendable to include another similar system in parallel in which the search radar is of the type having elevation as one of the coordinates. Examples are types C and E presentation. From the paralleled systems information concerning the X, Y and Z coordinates; $\Delta X$, $\Delta Y$ and $\Delta Z$; velocity and acceleration may be obtained. This information, consisting of voltages and voltage changes in the storage units, may be utilized in air-traffic-control operations, control computers and calculators, or in any other application where continuously corrected coordinates of moving targets are required.

The conversion from polar to cartesian coordinates by the system described is not required to make the system operable. It is advantageous to make this conversion, however, in that parallax corrections are simplified and target velocities and accelerations are the same as those for the targets being tracked. The latter advantage is not retained if the servos must track in polar coordinates.

While the principles of my invention have been described in connection with specific apparatus, it is to be understood that this description is made only by way of example and not as a limitation on the scope of my invention as set forth in the objects and the appended claims.

The invention described herein may be manufactured and used by or for the Government of the United States of America for governmental purposes without the payment of any royalties thereon or therefor.

What is claimed is:

1. An automatic tracking system of the type described comprising a cathode ray tube having a target area on which the electron beam is focused, means for deflecting the electron beam of said tube to scan a small area with respect to the total beam target area, means for defining in plan position a relatively small area of said target area corresponding to a remote object being tracked, control voltage generating means operative to produce output voltage in response to overlapping of the beam scan area and the defined object area and beam biasing means operative responsive to output voltage from said control voltage generating means to shift the center of said beam scan area toward the center of said defined object area.

2. An automatic tracking system of the type described comprising a cathode ray tube having a beam target area and vertical and horizontal beam deflection means, deflection voltage generating means coupled to said beam deflection means for deflecting the electron beam of said tube to scan a small area with respect to the total target area, means for defining in plan position a relatively small area of said target area corresponding to a remote object being tracked, control voltage generating means operative to produce output voltage in response to overlapping of the beam scan area and the defined object area, first beam biasing means coupled to said horizontal deflection means operative in response to output voltage from said control voltage generating means to shift horizontally the center of said beam scan area toward the center of said defined object area, and second beam biasing means coupled to said vertical deflection means operative in response to output voltage from said control voltage generating means to shift vertically the center of said beam scan area toward the center of said defined object area.

3. An automatic tracking system of the type described comprising a cathode ray tube having a beam target area and vertical and horizontal beam deflection plates, deflection voltage generating means coupled to said deflection plates to cause the electron beam of said tube to scan a small area with respect to the total target area, means for defining in plan position a relatively small area of said target corresponding to a remote object being tracked, control voltage generating means operative to produce output voltage in response to overlapping of the beam scan area and the defined object area, voltage generating means for generating substantially in phase quadrature first and second reference voltages, first and second phase detection means coupled to said vertical and horizontal deflection plates respectively, means for applying said first reference voltage and the output voltage from said control voltage generating means to said first phase detection means to produce a bias voltage applicable to said vertical deflection plates thereby shifting vertically the center of said beam scan area toward the center of said defined object area, and means for applying said second reference voltage and the output voltage from said control voltage generating means to said second phase detection means to produce a bias voltage applicable to said horizontal deflection plates thereby shifting horizontally the center of said beam scan area toward the center of said defined object area.

4. An automatic tracking system of the type described comprising a cathode ray tube having a beam target area, deflection voltage generating means for deflecting the electron beam of said tube to scan a small area with respect to the total target area, means for defining in plan position a plurality of relatively small areas of said target corresponding to a like number of remote objects being tracked, means for shifting the beam scan area to overlap at least a portion of separate defined object areas sequentially, and means operative in response to overlapping of said beam scan area and a defined object area to shift the center of said beam scan area toward the center of said defined object area.

5. An automatic tracking system of the type described comprising a cathode ray tube having a beam target area, deflection voltage generating means for deflecting the electron beam of said tube to scan a small area with respect to the total target area, means for defining in plan position a plurality of relatively small areas of said target corresponding to a like number of remote objects being tracked, means for shifting the beam scan area to overlap at least a portion of separate defined object areas sequentially, and means operative in response to overlapping of said beam scan area and a defined object area to cause said last-named means to shift the center of said beam scan area further towards the center of said defined object area.

6. An automatic tracking system of the type described comprising a cathode ray tube having a beam target area and beam deflection plates, deflection voltage generating means coupled to said deflection plates for deflecting the electron beam of said tube to scan a small area with respect to the total target area, means for defining in plan position a plurality of relatively small areas of said target corresponding to a like number of remote objects being tracked, a plurality of beam scan area shifting means adapted to be sequentially coupled to said deflection plates, means for initially biasing a number of said shifting means corresponding to the number of remote objects being tracked to cause said beam scan area to overlap at least a portion of separate defined object areas sequentially, and means coupled to said shifting means operative in response to overlapping of said beam scan area and a defined object area to cause the center of said beam scan area to shift towards the center of said defined object area.

7. A tracking system of the type described comprising a cathode ray tube having a target area on which the electron beam is focused, means for deflecting the electron beam of said tube to scan a small area with respect to the total beam target area, means for defining in plan position a plurality of relatively small areas on said target area corresponding to a like number of remote objects being tracked, a plurality of voltage storage units adapted to be successively coupled to said cathode ray tube and operative upon coupling to shift the beam scan area, and means for adjusting the stored voltage of individual storage units upon the coupling thereof to said cathode ray tube to cause at least a portion of said beam scan area to overlap separate defined object areas.

8. An automatic tracking system of the type described comprising a cathode ray tube having a target area on which the electron beam is focused, means for deflecting the electron beam of said tube to scan a small area with respect to the total beam target area, means for defining in plan position a plurality of relatively small areas on said target area corresponding to a like number of remote objects being tracked, a plurality of voltage storage units adapted to be successively coupled to said cathode ray tube and operative upon coupling to shift the beam scan area, manual means for separately adjusting the stored voltage of said storage units to cause at least a portion of said beam scan area to overlap separate defined object areas sequentially, and means coupled to said storage units automatically responsive to overlapping of said beam scan area and a defined object area to vary the storage unit voltage resulting in a shift of the center of said beam scan area toward the center of said defined object area.

9. An automatic tracking device of the type described comprising a cathode ray beam storage tube having a beam target, a writing electron beam, and a reading electron beam, means for applying pulse-echo information to said tube to cause said writing beam to define in plan position on said target a small area corresponding to a remote object being tracked, means for causing said reading beam to scan a small area with respect to the total target area, means for deriving an output control voltage from said tube in response to overlapping of the reading beam scan and the defined object area, and reading beam biasing means operative in response to said output control voltage to shift the center of said reading beam scan toward the center of said defined object area.

10. An automatic tracking system of the type described comprising a cathode ray beam storage tube having a beam target, a writing electron beam, and a reading electron beam, means for applying pulse-echo information to said tube to cause said writing beam to define in plan position a plurality of relatively small areas on said target corresponding to a like number of remote objects being tracked, deflection voltage generating means for deflecting said reading beam to scan a small area with respect to the total target area, means for shifting the reading beam scan to overlap at least a portion of separate defined object areas sequentially, means for deriving an output control voltage from said tube in response to overlapping of said reading beam scan and a defined object area, and means responsive to said output control voltage to cause said reading beam shifting means to shift the center of said reading beam scan toward the center of said defined object area.

11. An automatic tracking system of the type described comprising a cathode ray beam storage tube having a beam target, a writing electron beam with deflection plates therefor, and a reading electron beam with deflection plates therefor, deflection voltage generating means coupled to said reading deflection plates for deflecting said reading beam to scan a small area with respect to the total target area, means for applying pulse-echo information to said tube to cause said writing beam to define in plan position on said target a plurality of relatively small areas corresponding to a like number of remote objects being tracked, a plurality of reading beam scan shifting means adapted to be sequentially coupled to said reading deflection plates, means for initially biasing a number of said shifting means corresponding to the number of remote objects being tracked to cause said reading beam scan to overlap at least a portion of separate defined object areas sequentially, means for deriving an output control voltage from said tube in response to overlapping of said reading beam scan and a defined object area, and means responsive to said output control voltage to cause the corresponding shifting means to shift the center of said reading beam scan toward the center of said defined object area.

12. An automatic tracking system comprising a cathode ray tube having a signal storage screen, a writing electron beam with deflection means therefor and a reading electron beam with deflection means therefor, deflection voltage generating means coupled to said reading deflection means for deflecting said reading beam to scan a small area with respect to the total screen area, means for applying pulse-echo information to said tube to cause the said writing beam to store on said screen a plurality of image signals corresponding to a like number of remote objects being tracked, a plurality of voltage storage units adapted to be sequentially coupled to said reading beam deflection means and individually operative upon coupling to cause the reading beam to read off at least a portion of a corresponding image signal, and means responsive to the read-off signal for adjusting the stored voltage of the coupled storage unit thereby causing a shift of the center of said reading beam scan toward the center of said corresponding image signal.

13. An automatic tracking system comprising a cathode ray tube having a signal storage screen, a writing electron beam with deflection means therefor, and a reading electron beam with deflection means therefor, deflection voltage generating means coupled to said reading deflection means for deflecting said reading beam to scan a small area with respect to the total screen area, means for applying pulse-echo information to said tube to cause said writing beam to store on said screen a plurality of image signals corresponding to a like number of remote objects being tracked, a plurality of voltage storage units adapted to be sequentially coupled to said reading beam deflection means and, individually operative to shift the reading beam scan, means for initially setting the voltage of a number of said storage units corresponding to the number of image signals to cause said reading beam to read off at least a portion of said image signals sequentially, and means responsive to a read-off signal for resetting the voltage of the coupled storage unit thereby causing a shift of the center of said reading beam scan toward the center of the corresponding image signal.

14. An automatic tracking system comprising a cathode ray tube having a signal storage screen, a writing electron beam with deflection means therefor, and a reading electron beam with deflection means therefor, deflection voltage generating means coupled to said reading deflection means for deflecting said reading beam to scan a small area with respect to the total screen area, means for applying pulse-echo information to said tube to cause said writing beam to store on said screen a plurality of image signals corresponding to a like number of remote objects being tracked, a plurality of voltage storage units adapted to be sequentially coupled to said reading beam deflection means and individually operative to shift the reading beam scan, means for initially setting the voltage of a number of said storage units corresponding to the number of image signals to cause said reading beam to read off at least a portion of said image signals sequentially, means responsive to a read-off signal for resetting the voltage of the coupled storage unit thereby causing a shift of the center of said reading beam scan toward the center of the corresponding image signal, and monitor means for visually indicating the relative positions of said reading beam scan and the pulse-echo images.

References Cited by the Examiner
UNITED STATES PATENTS 2,508,384　5/1950　Gross _____ 343—11
2,524,295　10/1950　Mesner _____ 315—9

DAVID G. REDINBAUGH, *Primary Examiner.*

SAMUEL BOYD, NORMAN T. EVANS, J. H. LINSCOTT, T. A. GALLAGHER, *Examiners.*